July 13, 1965 N. C. HUSTED 3,194,874
MID-SPAN SERVICE TAKEOFF
Filed April 29, 1963 2 Sheets-Sheet 1

INVENTOR
Norris C. Husted
By Hooper, Leonard & Snell
his attorneys

July 13, 1965  N. C. HUSTED  3,194,874
MID-SPAN SERVICE TAKEOFF
Filed April 29, 1963  2 Sheets-Sheet 2

INVENTOR
Norris C. Husted
his Attorneys 3,194,874
MID-SPAN SERVICE TAKEOFF
Norris C. Husted, Richland Township, Allegheny
County, Pa. (R.D. 1, Gibsonia, Pa.)
Filed Apr. 29, 1963, Ser. No. 277,073
8 Claims. (Cl. 174—43)

This invention relates to span service takeoffs and particularly to a device for holding a service line extending from the mid-span of a power transmission line. This application is a continuation-in-part of my copending application Serial No. 204,505, filed June 22, 1962, and abandoned July 10, 1963. It is common practice in the electrical industry to carry a service line from the middle of a span of a transmission line to a service outlet such as a home or a plant or the like where electrical power is to be delivered. One of the major problems in handling such service lines from the mid-span section of a transmission line is that of firmly holding the service line in relation to the transmission line so that no pressure or pull from the service line is applied to the connections between the service line and the transmission line. Another serious problem is that of applying the holding mechanism without cutting the transmission lines in order to apply the holding device. Several hundred pounds of tension may occur between the service line and the transmission line because of wind, snow load, ice load and the like on the service line, tending to break the connections and overstress the holding device. This has accordingly posed a very difficult problem to the electrical transmission industry.

I have invented a span service takeoff which may be applied anywhere on a transmission line span without cutting the wires forming the transmission span and without any complex connectors or multiple loose parts to be assembled. I provide a pair of elongated members of dielectric material having generally L-shaped openings therein running in opposite directions so that when the members are placed side by side the ends of the two L-shaped openings are in alignment forming a passageway between the two elements, attaching or connecting means between the two elements adjacent one end slidably connecting the elements, a second attaching or connector means adjacent the opposite end connecting the elements against relative movement one with the other, and yoke means removably attached to the elements intermediate their ends to receive the customer's service line.

In the foregoing general description, I have set out certain objects, advantages and purposes of this invention. Other objects, advantages and purposes will be apparent from a consideration of the following description and the accompanying drawings in which FIGURE 1 is an isometric view of a segment of transmission line and power service line connected through the span takeoff of this invention;

Figure 1:
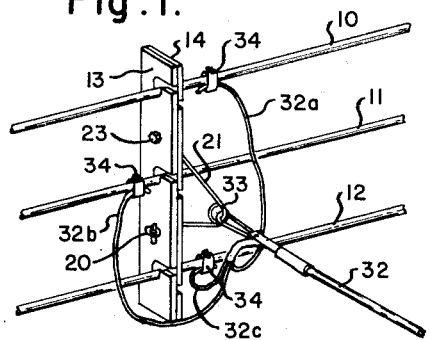

Referring to the drawings, I have illustrated three transmission wires 10, 11, and 12 at a point intermediate the span between two supporting poles (not shown). A mid-span takeoff according to my invention is made up of two elongated elements 13 and 14 of a dielectric material such as fiber glass impregnated with resins, porcelain, glass or the like materials. The element 13 is provided along one edge with L-shaped openings 15 spaced apart at equal intervals. The element 14 is provided with like L-shaped openings 16 turned in the opposite direction from openings 15 of element 13. The elements 13 and 14 are provided with slots 17 and 18 adapted to receive a leg 19 and stop ring 20 of a yoke 21. Each of the elements 13 and 14 is also provided with an opening 22 adapted to receive a bolt 23 which passes through a hook member 24 on the yoke 21 and the openings 22. The bolt 23 is held in place by a nut 25.

When it is desired to apply a service line to the span of wires 10, 11 and 12, the elements 13 and 14 are assembled over the leg 19 and slid longitudinally so that the entrance of the L-shaped openings 15 and 16 are in alignment. They are then placed over wires 10, 11 and 12 and slid longitudinally until they are in alignment. At this point, the wires 10, 11 and 12 are forced into the end of the base 30 and 31 of the L-shaped openings 15 and 16. The bolt 23 is inserted through the end 24 of yoke 21 and openings 22 and the nut 25 is applied. This firmly attaches the elements 13 and 14 to the span wires 10, 11 and 12 with the span wires enclosed within the elements in such fashion that there are two thicknesses of elements 13 and 14 on each side of each wire in the horizontal plane. The service wire 32 is then attached to the ring 33 of yoke 21 in conventional fashion and the ends of the service wires 32a, 32b, 32c are attached to the span wires 10, 11 and 12 by conventional connectors 34. The connectors 34 are preferably disposed on opposite sides of the takeoff elements 13 and 14 as shown in FIGURE 1, thus preventing movement of the elements 13 and 14 longitudinally of the span wires and providing improved electrical insulation between the contacts.

Figure 3:
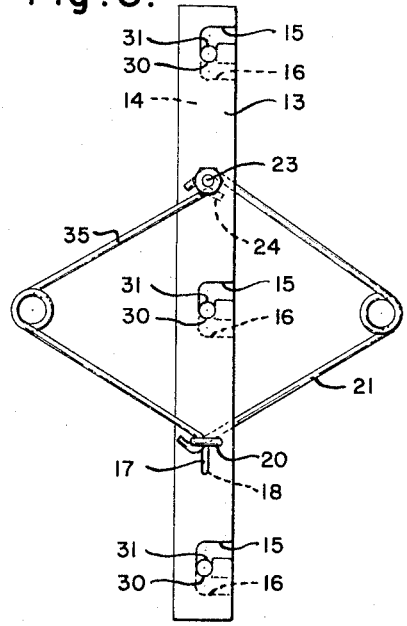
FIGURE 3 is a side elevation of a second embodiment of span service takeoff according to my invention.

In the embodiment illustrated in FIGURE 3, a second yoke 35 is attached to the ring 20 of yoke 21 and to the bolt 23 on the opposite side of the elements 13 and 14 from the yoke hook end 24. This form of span takeoff may be used where it is desired to provide service on opposite sides of the span wires 10, 11 and 12.

Figure 2:
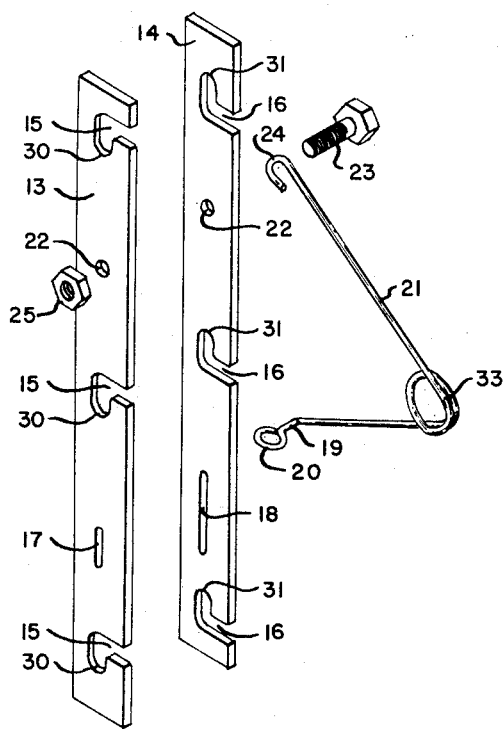
FIGURE 2 is an exploded view of the elements of the span takeoff of my invention.
Figure 4:
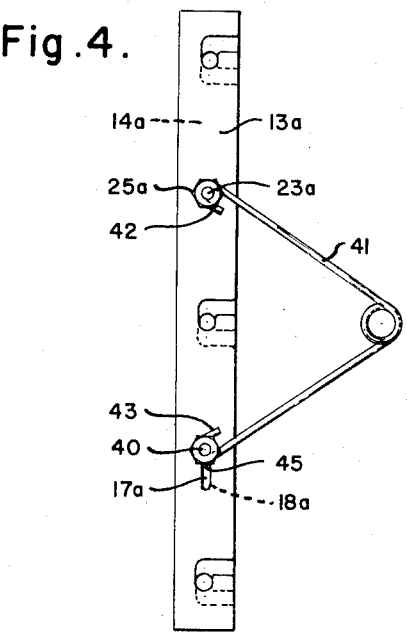
FIGURE 4 is a third embodiment of span service takeoff according to my invention.

In the embodiment illustrated in FIGURE 4, elements 13a and 14a are identical with elements 13 and 14 of FIGURES 1 and 2. A bolt 40 is inserted through the slots 17a and 18a instead of the leg 19 and ring 20 of FIGURE 1. A yoke 41 having hook elements 42 and 43 on the ends is hooked over bolts 40 and 23a and held in place by nuts 45 and 25a. The operation of the span takeoff of FIGURE 4 is identical with that of FIGURES 1 and 2, the elements 13a and 14a being slidable on bolt 40 and held after placement on the wires by bolt 23a.

Figure 5:
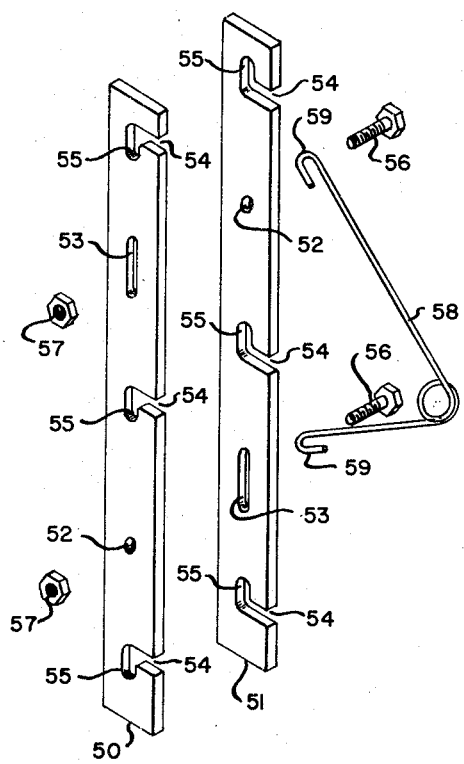
FIGURE 5 is an exploded view of the elements of a fourth embodiment of span service takeoff according to my invention.
Figure 6:
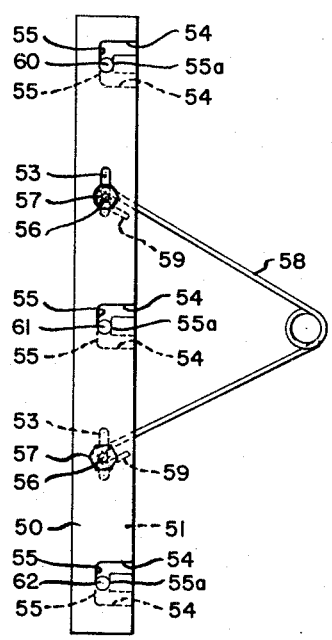
FIGURE 6 is a side elevation of the assembled span service takeoff of FIGURE 5.

In the embodiment illustrated in FIGURES 5 and 6, I have illustrated a form of my invention in which the fastening bolts remain in place during insertion of the wires and the two span service takeoff elements are slid longitudinally with respect to each other to release or fasten the wire strands. In this form a pair of elements 50 and 51, of identical configuration, are placed in side by side relation with hole 52 of one element opposite slot 53 of the other element and with the opening 54 of L-shaped slots 55 opening in the same direction. Bolts 56 pass through holes 52 and slots 53 and nuts 57 hold the pieces in side by side relation. A bail 58 may be attached under nuts 57 by slipping U-shaped ends 59 over the bolts 56 between the bolt heads and the takeoff members 50 or 51. To attach to a span, the nuts 57 are loosened and the two elements 50 and 51 are moved lengthwise with bolt 56 in the hole 52 of one element sliding in slot 53 of the other element until the openings 54 of both elements are in alignment. The wires 60, 61 and 62 are inserted through openings 54 to the bottom of L-slots 55 and the elements 50 and 51 are moved longitudinally to engage the wires in the offset portion 55a of the two opposed wires. This provides two thicknesses of holding elements 50 and 51 on each of the sides of the wire transverse to the length of the span holding elements 50 and 51. This eliminates the need for any loose nuts and bolts and provides a structure which prevents breakouts of the wire from the span service elements as was characteristic of prior art devices.

It is evident from the foregoing description that the span takeoff of this invention may be rapidly applied to the span of transmission wires without cutting them or otherwise interrupting their continuity and that when applied the span wires are surrounded so that a portion of both elements 13 and 14 lies on opposite sides of each transmission wire in the horizontal plane so that any pull on the wire is applied through a portion of each of elements 13 and 14 rather than through a portion of one or the other to the exclusion of one element. This imparts very high strength to the device without excessive weight and prevents fracture of the elements 13 or 14 by pull against the span wires.

While I have illustrated and described certain preferred embodiments of my invention, it will be understood that this invention may be otherwise embodied within the scope of the following claims.

I claim:
1. A span service takeoff comprising a pair of elongated members of dielectric material lying in side by side relation, a like number of spaced L-shaped openings on each member, each having an entrance on an edge of said members, said openings being positioned on said members so that in one lengthwise side-by-side position of said members the entrances are in alignment and in a second position with the members shifted lengthwise from said one position the entrances are closed and the opposite extremes of the openings are aligned to form a through passage, attaching means between said members permitting limited relative lengthwise movement in one position and fixing the members together against relative movement in a second position and yoke means separate from the attaching means removably attached to said members intermediate their ends.

2. A span service takeoff comprising a pair of elongated members of dielectric material lying in side by side relation, a like number of spaced openings on each member, each opening having an entrance on an edge of said members, said openings on the two members having laterally offset portions in opposite directions and being positioned on said members so that in one side by side position of the members the entrances are in alignment and in a second side-by-side position the entrances are closed and the laterally offset portions are aligned to form a through passage, attaching means between said members permitting limited relative lengthwise movement, connector means for fixing the members together against relative movement and yoke means separate from the connector means removably attached to said members intermediate their ends.

3. A span service takeoff comprising a pair of elongated members of dielectric material lying in side by side relation, a like number of spaced openings on each member, each opening having an entrance on an edge of said members, each of said openings having a laterally offset portion, said laterally offset portions extending longitudinally of the members adjacent the center line thereof and in opposite directions on the respective members and being positioned on said members so that in one side by side position of the elements the entrances are in alignment and in a second side-by-side position the entrances are closed and the opposite extremes of the openings are aligned to form a through passage, a slot in at least one member on the center line intermediate the ends, attaching means extending through said slot and connecting in the other member, said members having limited relative lengthwise movement, connector means for fixing the members together against relative movement and yoke means separate from the connector means removably attached to said members intermediate their ends.

4. A span service takeoff comprising a pair of elongated members of dielectric material lying in side by side relation and being relatively movable lengthwise with respect to one another, a like number of spaced L-shaped openings on each member, each opening having an entrance on an edge of each said member, said openings being side by side positioned on said members so that in one position the entrances are in alignment and in a second side-by-side position the entrances are closed and the opposite extremes of the openings are aligned to form a through passage, a slot in at least one of the members on the center line, attaching means passing through the slot and the other of said members permitting limited relative lengthwise movement, connector means spaced from the slot and engaging the members for fixing the members together against relative movement and yoke means separate from the attaching and connector means removably attached to said members intermediate their ends adapted to receive a service takeoff.

5. A span service takeoff comprising a pair of elongated members of dielectric material lying in side by side relation and being relatively movable lengthwise, a like number of spaced L-shaped openings on each member, each opening in each member having an entrance on one common edge of each said member, said openings being positioned on said members so that in one side-by-side position the entrances of both members are in alignment and adapted to receive a line wire and in a second side-by-side position the entrances are closed and the opposite extremes of the openings are aligned to form a through passage to retain the line wire on the center line of the members with a portion of each member lying on each side of the line wire in a plane transverse to the length of the members, attaching means between said members permitting limited relative lengthwise movement, connector means for fixing the members together against relative movement and yoke means separate from the attaching and connector means removably attached to said members intermediate their ends.

6. A span service takeoff as claimed in claim 5 wherein one end of the yoke means passes through slots in both members to permit relative lengthwise movement and serves as the attaching means and the connector means is a bolt passing through the two members.

7. A span service takeoff comprising a pair of elongated members of dielectric material lying in side by side relation and being relatively movable lengthwise, an equal number of spaced L-shaped openings on each member each opening having a separate entrance on one common edge of each said member, said openings being positioned on said members so that in one side by side position the entrances of both members are in alignment and adapted to receive line wires and in a second position the entrances are closed and the opposite extremes of the openings are aligned to form a through passage to retain the line wires within the members with a portion of each member on each side of the line wire in a plane transverse to the length of the members, a slot in at least one of said members slidably receiving an attaching means between said members permitting limited relative lengthwise movement, connector means for fixing the members together against relative movement and yoke means removably attached to said members intermediate their ends.

8. A span service takeoff as claimed in claim 7 wherein the yoke means comprises oppositely directed yokes removably attached to said members.

References Cited by the Examiner

UNITED STATES PATENTS

| | | | |
|---|---|---|---|
| 2,369,169 | 2/45 | Mochel | 24—132 X |
| 2,457,435 | 12/48 | Beckman. | |
| 2,783,296 | 2/57 | Hendrix | 174—146 X |
| 2,791,335 | 5/57 | Leebow. | |
| 2,825,751 | 3/58 | Flower | 174—146 |
| 3,066,181 | 11/62 | Flower | 174—146 |
| 3,066,182 | 11/62 | Flower | 174—146 |
| 3,073,890 | 1/63 | Chewning et al. | 174—146 |

LARAMIE E. ASKIN, *Primary Examiner.*

JOHN P. WILDMAN, *Examiner.*

UNITED STATES PATENT OFFICE
CERTIFICATE OF CORRECTION

Patent No. 3,194,874                            July 13, 1965

Norris C. Husted

It is hereby certified that error appears in the above numbered patent requiring correction and that the said Letters Patent should read as corrected below.

Column 4, line 39, strike out "attaching and"; column 6, line 3, strike out "24-132X".

Signed and sealed this 15th day of March 1966.

(SEAL)
Attest:

ERNEST W. SWIDER                            EDWARD J. BRENNER
Attesting Officer                               Commissioner of Patents